United States Patent [19]

Tobias

[11] 4,098,735
[45] Jul. 4, 1978

[54] WATER REDUCIBLE EPOXY ESTER USING MONOCARBOXYLIC ACID TO CONTROL MOLECULAR WEIGHT

[75] Inventor: Michael Allan Tobias, Bridgewater, N.J.

[73] Assignee: Mobil Oil Corporation, New York, N.Y.

[21] Appl. No.: 768,312

[22] Filed: Feb. 14, 1977

[51] Int. Cl.² ............................................. C08G 51/24
[52] U.S. Cl. ........................... 260/18 EP; 260/22 EP; 260/29.2 EP; 428/418
[58] Field of Search ....... 260/18 EP, 22 EP, 29.2 EP; 428/418

[56] References Cited

U.S. PATENT DOCUMENTS

| | | | |
|---|---|---|---|
| 3,280,056 | 10/1966 | Masters | 260/18 EP |
| 3,374,193 | 3/1968 | Tsatsos et al. | 260/18 EP |
| 3,706,684 | 12/1972 | Lopez | 260/18 EP |
| 3,707,516 | 12/1972 | Walus | 260/18 EP |
| 3,709,846 | 1/1973 | Tsow | 260/18 EP |
| 3,878,145 | 4/1975 | Guldenpfennig | 260/18 EP |
| 3,985,695 | 10/1976 | Tobias et al. | 260/47 EN |

*Primary Examiner*—Eugene C. Rzucidlo
*Attorney, Agent, or Firm*—C. A. Huggett; Hastings S. Trigg

[57] ABSTRACT

A water reducible epoxy ester is prepared by reacting an epoxy resin, preferably a diglycidyl ether of bisphenol A, with a monocarboxylic acid ($C_8$–$C_{18}$) and a dibasic acid (e.g., azelaic acid) followed by reaction with trimellitic anhydride and neutralization of free carboxyl groups. This material is dispersed in an aqueous vehicle, applied to a metal substrate, and baked.

27 Claims, No Drawings

WATER REDUCIBLE EPOXY ESTER USING MONOCARBOXYLIC ACID TO CONTROL MOLECULAR WEIGHT

BACKGROUND OF THE INVENTION

1. Field of the Invention

This invention is concerned with an improved epoxy ester composition and baked coatings of it on metal substrates.

2. Description of the Prior Art

U.S. Pat. No. 3,985,695 discloses an epoxy ester in which a monofunctional 1,2-epoxy is used to control molecular weight, i.e., as a chain stopper. Insofar as is now known it has not been proposed to use a monocarboxylic acid for this purpose.

SUMMARY OF THE INVENTION

This invention provides an epoxy ester comprising an ester adduct of a polyfunctional 1,2-epoxy resin and a monocarboxylic acid with a saturated dibasic acid and trimellitic anhydride, wherein free carboxyl groups are neutralized with ammonia or an amine.

It also provides a coating composition comprising said epoxy ester in an aqueous vehicle and metal substrates coated therewith.

DESCRIPTION OF PREFERRED EMBODIMENTS

The epoxy resin can be any polyglycidyl ether of polyhydric organic compounds, especially polyhydric phenols. Particularly preferred are the glycidyl ethers of bisphenols, a class of compounds which are constituted by a pair of phenolic groups interlinked through an intervening aliphatic bridge. While any of the bisphenols may be used, the compound 2,2-bis(p-hydroxyphenyl) propane, commonly known as bisphenol A, is more widely available in commerce and is preferred. While polyglycidyl ethers can be used, diglycidyl ethers are preferred.

The preferred 1,2-epoxy resins will have an epoxide equivalent (grams of resin containing one gram-equivalent of epoxide) of between about 180 and about 2500 and an epoxy value between about 0.55 and about 0.04 equivalents epoxy/100 grams. The preferred epoxy resin, i.e., those made from bisphenol A, will have two epoxy groups per molecule.

The aliphatic monocarboxylic acids utilizable herein have between 8 and 18 carbon atoms and a molecular weight between about 140 and about 290. Mixtures of monocarboxylic acids are contemplated. Non-limiting examples of the aliphatic monocarboxylic acids and mixtures thereof are octanoic acid, nonanionic acid, decanoic acid, undecanoic acid, lauric acid, tridecanoic acid, myristic acid, pentadecanoic acid, palmitic acid, heptadecanoic acid, stearic acid, oleic acid, linoleic acid, linolenic acid, ricinoleic acid, linseed fatty acids, safflower fatty acids, soya fatty acids, tall oil fatty acids, cottonseed fatty acids, castor oil fatty acids, dehydrated castor oil fatty acids, and tung oil fatty acids.

The ratio of dicarboxylic acid to monocarboxylic acid will be between about 2 and about 5, based upon the equivalent weight of each acid.

The aliphatic dicarboxylic acid reacted with the epoxides has the structure HOOC(CH$_2$)$_n$COOH, wherein $n$ is 4–8. The aliphatic dicarboxylic acids include adipic acid, pimelic acid, suberic acid, azelaic acid, and sebacic acid. Azelaic acid is preferred.

It is also within the contemplation of this invention to use dimerized unsaturated fatty acids up to and including 36 carbon atom dimer acids and diacids resulting from the Diels-Alder reaction of acrylic acid or methacrylic acid with conjugated unsaturated fatty acids having up to 18 carbon atoms, e.g.,

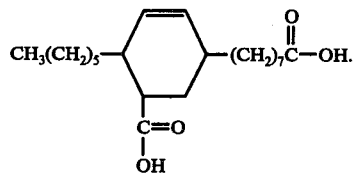

The ratio of equivalents of total aliphatic carboxylic acid (monocarboxylic acid plus dicarboxylic acid) to epoxide equivalents is between 1.0 and 1.2.

The reaction between polyfunctional epoxy resin, aliphatic monocarboxylic acid, and aliphatic dicarboxylic acid is feasibly, but not necessarily, carried out in a suitable solvent, such as methyl ethyl ketone (about 5–10 wt. % of reactants). These reactants are dissolved in the methyl ethyl ketone at about 85°–95° C. Then, the reaction mixture containing, preferably, a catalyst is heated to about 150° C. and maintained at that temperature under reflux for about 1.5 hours until the alcoholic acid number is, 3–22, preferably 11–14, and the epoxy content is 0.025–0.035 meq./g. It is generally feasible to remove some of the methyl ethyl ketone through a suitable reflux trap, such as a Dean-Stark trap, in order to maintain reflux temperature.

The esterification reaction and the subsequent reaction with trimellitic anhydride, infra, can occur without the aid of a catalyst. Catalysts are preferred, however, such as quaternary ammonium hydroxides, such as benzyltrimethylammonium hydroxide; tertiary amines, such as triethylamine, tri-n-butylamine; N,N-dimethylaniline; N,N-benzylmethylamine; and KOH.

After the desired epoxy content has been attained, the reaction mixture is cooled (about 120° C.) and an amount of methyl ethyl ketone is added to make up the amount previously removed to maintain reflux. Then, trimellitic anhydride is added to the reaction mixture and the reaction is maintained at about 120° C. for about 2.5 hours until the alcohol acid number and the aqueous acid number are substantially equal, indicating absence of anhydride moieties. The amount of trimellitic anhydride used is such that the ratio of anhydride equivalents in trimellitic anhydride to equivalents epoxide is 0.15 to 0.35. The acid number of the final polymer will be in the range of about 40 to 80.

The final polymer mixture is diluted to a solids content of about 65–75 with an alkoxy ethanol, such as butoxyethanol (Butyl Cellosolve), methoxyethanol (Methyl Cellosolve), ethoxyethanol (Cellosolve) and hexoxyethanol (Hexyl Cellosolve) and an alcohol, such as t-butyl alcohol or a diethylene glycol monoalkyl ether, such as diethylene glycol monomethyl ether (Methyl Carbitol) and diethylene glycol monoethyl ether (Carbitol). A preferred combination is Butyl Cellosolve and t-butyl alcohol, using about equal parts by weight of each.

To make the final coating composition the aforedescribed diluted polymer is further reduced with water and a neutralizing amine to afford a water-based epoxy ester. The total solids content will be between about 29–31% and a pH of 7–9. The viscosity should be about 50–75 seconds, #4 Ford Cup. Utilizable neutralizing amines include ammonia and N,N-dimethylethanolamine. The latter is preferred.

The coating composition can contain other well known adjuvants such as lubricants (waxes, etc.), surfactants, and wetting, leveling, and flow control agents. The coating compositions as described are clear solutions, but they can be pigmented with any of the usual pigments known in the coatings art.

The water-reduced coating composition can be applied to a variety of metal substrates suitable for making metal cans, such as tinplated steel, tin-free steel, and aluminum. The coating composition is applied by roll coat, spray, or brush to a coating weight of 3–5 mg./sq. in.

Baking to cure the coatings is satisfactorily carried at about 350° F. for about 10 minutes to about 450° F. for about 2 minutes. At temperatures below about 350° F. it is necessary to use an aminoplast and at below 300° F., long bake times of about 30 minutes are required. At temperatures of about 500° F., short bake times (½ min.) and an aminoplast may both be required. Any aminoplast well known in the art can be used, such as an alkylated melamine. Water soluble aminoplasts would be preferred.

EXAMPLE 1

A four liter resin kettle was charged with 111.0 g. of methyl ethyl ketone and 1000.0 g. of epoxy resin (diglycidyl ether of bisphenol A) having an epoxide content of 2.05 meq. epoxy/g. The mixture was heated to dissolve the epoxy resin and then further heated to 100° C. at which point 67.0 g. of octanoic acid, 168.0 g. of azelaic acid, and 3.3 g. of tri-n-butylamine were added. The temperature was raised gradually to 150° C. while removing sufficient methyl ethyl ketone (~70 g.) to maintain controlled reflux at this temperature. The reaction was maintained at 150° C. for 1.5 hours until an alcoholic acid number of 11–14 and an epoxy content of 0.025–0.035 meq./g. were obtained. The reaction mixture was then cooled to 120° C. and an amount of fresh methyl ethyl ketone, equal to that removed earlier, was added. The temperature was again adjusted to 120° C. and 115.0 g. of trimellitic anhydride was added. The reaction was maintained at 120° C. for 2.5 hours until an alcoholic acid number of 61–63 and an aqueous acid number of 63–65 were obtained. The reaction was cooled to 110° C. and 265.0 g. of Butyl Cellosolve added. Further cooling to 105° C. was followed by addition of 265.0 g. of t-butyl alcohol.

EXAMPLE 2

A four liter resin kettle was charged with 111.0 g. of methyl ethyl ketone and 1000.0 g. of epoxy resin (diglycidyl ether of bisphenol A) having an epoxide content of 2.05 meq. epoxy/g. The mixture was heated to dissolve the epoxy resin and then further heated to 100° C. at which point 67.0 g. of 2-ethylhexanoic acid, 168.0 g. of azelaic acid, and 3.3 g. of tri-n-butylamine were added. The temperature was raised gradually to 150° C. while removing sufficient methyl ethyl ketone (~70 g.) to maintain controlled reflux at this temperature. The reaction was maintained at 150° C. for 1.5 hours until an alcoholic acid number of 11–14 and an epoxy content of 0.025–0.035 meq./g. were obtained. The reaction mixture was then cooled to 120° C. and an amount of fresh methyl ethyl ketone, equal to that removed earlier, was added. The temperature was again adjusted to 120° C. and 115.0 g. of trimellitic anhydride was added. The reaction was maintained at 120° C. for 2.5 hours until an alcoholic acid number of 61–63 and an aqueous acid number of 63–65 were obtained. The reaction was cooled to 110° C. and 265.0 g. of Butyl Cellosolve added. Further cooling to 105° C. was followed by addition of 265.0 g. of t-butyl alcohol.

EXAMPLE 3

A four liter resin kettle was charged with 111.0 g. of methyl ethyl ketone and 1000.0 g. of epoxy resin (diglycidyl ether of bisphenol A) having an epoxide content of 2.05 meq. epoxy/g. The mixture was heated to dissolve the epoxy resin and then further heated to 100° C. at which point 132.0 g. of dehydrated castor oil fatty acids, 168.0 g. of azelaic acid, and 3.3 g. of tri-n-butylamine were added. The temperature was raised gradually to 150° C. while removing sufficient methyl ethyl ketone (~70 g.) to maintain controlled reflux at this temperature. The reaction was maintained at 150° C. for 1.5 hours until an alcoholic acid number of 11–14 and an epoxy content of 0.025–0.035 meq./g. were obtained. The reaction mixture was then cooled to 120° C. and an amount of fresh methyl ethyl ketone, equal to that removed earlier, was added. The temperature was again adjusted to 120° C. and 125.0 g. of trimellitic anhydride was added. The reaction was maintained at 120° C. for 2.5 hours until an alcoholic acid number of 61–63 and an aqueous acid number of 63–65 were obtained. The reaction was cooled to 110° C. and 275.0 g. of Butyl Cellosolve added. Further cooling to 105° C. was followed by addition of 275.0 g. of t-butyl alcohol.

EXAMPLE 4

A four liter resin kettle was charged with 110.0 g. of methyl ethyl ketone and 1000.0 g. of epoxy resin (diglycidyl ether of bisphenol A) having an epoxide content of 2.05 meq. epoxy/g. The mixture was heated to dissolve the epoxy resin and then further heated to 95° C. at which point 131.0 g. of oleic fatty acids, 131.0 g. of adipic acid, and 3.3 g. of tri-n-butylamine were added. The temperature was raised gradually to 150° C. while removing sufficient methyl ethyl ketone (~56 g.) to maintain controlled reflux at this temperature. The reaction was maintained at 150° C. for 1.5 hours until an alcoholic acid number of 11–14 and an epoxy content of 0.025–0.035 meq./g. were obtained. The reaction mixture was then cooled to 120° C. and an amount of fresh methyl ethyl ketone, equal to that removed earlier, was added. The temperature was again adjusted to 120° C. and 125.0 g. of trimellitic anhydride was added. The reaction was maintained at 120° C. for 2.5 hours until an alcoholic acid number of 61–63 and an aqueous acid number of 63–65 were obtained. The reaction was cooled to 110° C. and 245.0 g. of Butyl Cellosolve added. Further cooling at 105° C. was followed by addition of 245.0 g. of t-butyl alcohol.

EXAMPLE 5

A four liter resin kettle was charged with 110.0 g. of methyl ethyl ketone and 1000.0 g. of epoxy resin (diglycidyl ether of bisphenol A) having an epoxide content of 2.05 meq. epoxy/g. The mixture was heated to dissolve the epoxy resin and then further heated to 95° C. at which point 134.0 g. of dehydrated castor oil fatty acids, 131.0 g. of adipic acid, and 3.3 g. of tri-n-butylamine were added. The temperature was raised gradually to 150° C. while removing sufficient methyl ethyl ketone (~56 g.) to maintain controlled reflux at this temperature. The reaction was maintained at 150° C. for 1.5 hours until an alcoholic acid number of 11-14 and an epoxy content of 0.025-0.035 meq./g. were obtained. The reaction mixture was then cooled to 120° C. and an amount of fresh methyl ethyl ketone, equal to that removed earlier, was added. The temperature was again adjusted to 120° C. and 120.0 g. of trimellitic anhydride was added. The reaction was maintained at 120° C. for 2.5 hours until an alcoholic acid number of 61-63 and an aqueous acid number of 63-65 were obtained. The reaction was cooled to 110° C. and 245.0 g. of Butyl Cellosolve added. Further cooling to 105° C. was followed by addition of 245.0 g. of t-butyl alcohol.

EXAMPLE 6

A four liter resin kettle was charged with 110.0 g. of methyl ethyl ketone and 1000.0 g. of epoxy resin (diglycidyl ether of bisphenol A) having an epoxide content of 2.05 meq. epoxy/g. The mixture was heated to dissolve the epoxy resin and then further heated to 95° C. at which point 67.0 g. of octanoic acid, 110.0 g. of adipic acid, 83.0 g. of dimerized tall oil fatty acids, and 3.3 g. of tri-n-butylamine were added. The temperature was raised gradually to 150° C. while removing sufficient methyl ethyl ketone (~68 g.) to maintain controlled reflux at this temperature. The reaction was maintained at 150° C. for 1.5 hours until an alcoholic acid number of 11-14 and an epoxy content of 0.025-0.035 meq./g. were obtained. The reaction mixture was then cooled to 120° C. and an amount of fresh methyl ethyl ketone, equal to that removed earlier, was added. The temperature was again adjusted to 120° C. and 120.0 g. of trimellitic anhydride was added. The reaction was maintained at 120° C. for 2.5 hours until an alcoholic acid number of 61-63 and an aqueous acid number of 63-65 were obtained. The reaction was cooled to 110° C. and 245.0 g. of Butyl Cellosolve added. Further cooling to 95° C. was followed by addition of 245.0 g. of t-butyl alcohol.

EXAMPLE 7

A four liter resin kettle was charged with 110.0 g. of methyl ethyl ketone and 1000.0 g. of epoxy resin (diglycidyl ether of bisphenol A) having an epoxide content of 2.05 meq. epoxy/g. The mixture was heated to dissolve the epoxy resin and then further heated to 95° C. at which point 93.0 g. of lauric acid, 110.0 g. of adipic acid, 83.0 g. of dimerized tall oil fatty acids, and 3.3 g. of tri-n-butylamine were added. The temperature was raised gradually to 150° C. while removing sufficient methyl ethyl ketone (~68 g.) to maintain controlled reflux at this temperature. The reaction was maintained at 150° C. for 1.5 hours until an alcoholic acid number of 11-14 and an epoxy content of 0.025-0.035 meq./g. were obtained. The reaction mixture was then cooled to 120° C. and an amount of fresh methyl ethyl ketone, equal to that removed earlier, was added. The temperature was again adjusted to 120° C. and 125.0 g. of trimellitic anhydride was added. The reaction was maintained at 120° C. for 2.5 hours until an alcoholic acid number of 61-63 and an aqueous acid number of 63-65 were obtained. The reaction was cooled to 110° C. and 250.0 g. of Butyl Cellosolve added. Further cooling to 95° C. was followed by addition of 250.0 g. of t-butyl alcohol.

EXAMPLE 8

A four liter resin kettle was charged with 1000.0 g. of epoxy resin (diglycidyl ether of bisphenol A) having an epoxide content of 2.05 meq. epoxy/g. This resin was heated to 100° C. at which point 134.0 g. of dehydrated castor oil fatty acids, 131.0 g. of adipic acid, and 3.3 g. of tri-n-butylamine were added. The temperature was raised gradually to 150° C. and maintained there for 1.5 hours until an alcoholic acid number of 11-14 and an epoxy content of 0.025-0.035 meq./g. were obtained. The reaction mixture was then cooled to 135° C. and 100.0 g. of 1-methyl-2-pyrrolidone was added. The temperature was adjusted to 120° C. and 120.0 g. of trimellitic anhydride was added. The reaction was maintained at 120° C. for 2.5 hours until an alcoholic acid number of 61-63 and an aqueous acid number of 63-65 were obtained. The reaction was cooled to 110° C. and 245.0 g. of Butyl Cellosolve added. Further cooling to 105° C. was followed by addition of 245.0 g. of Methyl Carbitol.

COATING EVALUATION

The epoxy ester solutions of Examples 1-3 were diluted with water and sufficient N,N-Dimethylethanolamine and other additives (as described in Example 5, U.S. Pat. No. 3,985,695 which is incorporated herein by reference) to give a clear water based coating composition having the solids content and pH indicated in Table I. Each composition was applied by roller to tin-plated steel (ETP) and aluminum at a rate of 3.5-4.0 mg./in.² Each coating was baked 10 min. at 375° F. and film properties were evaluated and compared to Example 4, U.S. Pat. No. 3,985,695. In the evaluation, a rating of 10 is perfect for blush and adhesion and 30 is perfect for beer can end rating. The data are set forth in Table I.

The epoxy ester solutions of Examples 4-7 were diluted with water and sufficient N,N-Dimethylethanolamine to give clear water based coating compositions. Each composition was applied to untreated aluminum at a rate of 3.0 mg./in.² and baked 2 min. at 400° F. Film properties were evaluated and are tabulated in Table II. In the evaluation a rating of 10 is perfect for wetting, adhesion, blush and wedge bend flexibility.

Table I

| Physical Properties | Example 4 U.S. Patent 3,985,695 | Example (This application) 1 | 2 | 3 |
|---|---|---|---|---|
| Solids, % | 30 | 29.5 | 29.5 | 29.5 |
| Viscosity, #4 Ford Cup | 60 sec. | 62 sec. | 68 sec. | 65 sec. |
| pH | 8.5 | 8.6 | 8.6 | 8.5 |
| Film Properties | | | | |
| MEK resistance (double rub) | 30 | 35 | 36 | 35 |
| Process resistance 90 min. at 250° F. | | | | |
| Blush | 10 | 8 | 7 | 9+ |
| Adhesion | 10 | 10 | 10 | 10 |
| Fuming Resistance | Good | Good | Good | Good |
| Gloss | Exc. | Exc. | Exc. | Exc. |

Table I-continued

| Physical Properties | Example 4 U.S. Patent 3,985,695 | Example (This application) 1 | 2 | 3 |
|---|---|---|---|---|
| Beer can end (double seam) ETP | 23 | 23 | 23 | 23 |
| Aluminum | 27 | 27 | 27 | 27 |

Table II

| Physical Properties | Example 4 | | 5 | | 6 | | 7 | |
|---|---|---|---|---|---|---|---|---|
| % Cymel 303* (on Epoxy-Ester) | 0 | 3 | 0 | 3 | 0 | 3 | 0 | 3 |
| Wetting | 10 | 10 | 9 | 10 | 9 | 10 | 10 | 10 |
| Dry Adhesion | 10 | 10 | 10 | 10 | 10 | 10 | 10 | 10 |
| MEK resistance (double rub) | 6 | 16 | 16 | 19 | 5 | 14 | 4 | 12 |
| Wedge Bend Flexibility | 8 | 8 | 8 | 7 | 8 | 8 | 9 | 8 |
| Pasteurization resistance 45 min. at 170° F. | | | | | | | | |
| Blush | 10 | 10 | 10 | 10 | 10 | 10 | 10 | 10 |
| Adhesion | 10 | 10 | 10 | 10 | 10 | 10 | 10 | 10 |
| Process resistance 30 min. at 212° F. | | | | | | | | |
| Blush | 8 | 9 | 8 | 9 | 8 | 9 | 8 | 8 |
| Adhesion | 10 | 10 | 10 | 10 | 10 | 10 | 10 | 10 |
| Process resistance 90 min. at 250° F. | | | | | | | | |
| Blush | 10 | 10 | 10 | 10 | 10 | 10 | 10 | 10 |
| Ahesion | 10 | 10 | 10 | 10 | 10 | 10 | 10 | 10 |

*Hexamethoxymethylmelamine

The properties of the resin of this invention contribute to a wide variety of uses other than can coatings. When pigmented with carbon black at a pigment-/binder ratio of about 0.1/1, modified with a crosslinking agent such as a methylated urea, applied on cold rolled steel to a dry film thickness of 0.2–0.4 mil. and baked for about 60 seconds at 500° F., the resultant coated metal can be subjected to the severe fabrication required for end uses such as canisters for photographic film without degradation of the coating.

Another end use is a primer for cold rolled steel or hot dipped galvanized steel which, after application of suitable topcoat enamels, will be fabricated into appliance parts (washers, dryers, refrigerators, etc.). For this end use, an inhibitive pigment such as zinc chromate or strontium chromate would be incorporated as a portion of the total pigmentation with the total pigment/binder ratio being about 0.5/1. Again, the addition of a crosslinking agent would be desirable. The usual film thickness for primers for this end use is 0.2–0.4 mil; the normal bake cycle is about 30 seconds at 700° F. air temperature.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An epoxy ester comprising an ester adduct of a polyfunctional 1,2-epoxy resin and an aliphatic monocarboxylic acid having between about 8 carbon atoms and 18 carbon atoms or mixtures thereof and an aliphatic dicarboxylic acid having between about 6 and about 10 carbon atoms, the ratio of dicarboxylic acid to monocarboxylic acid being between about 2 and about 5, based upon the equivalent weight of each acid, the ratio of total aliphatic carboxylic acid equivalents (monocarboxylic acid plus dicarboxylic acid) to epoxide equivalents being between 1.0 and 1.2, and trimellitic anhydride, the ratio of anhydride equivalents in said trimellitic anhydride to equivalents of epoxy being between 0.15 and 0.35; the reaction between said epoxy resin, said monocarboxylic acid, and said dicarboxylic acid being carried out in a solvent under reflux at an elevated temperature until the acid number is 3–22 and the epoxy content is 0.025–0.035 meq./g. to obtain an initial ester and reacting said initial ester with trimellitic anhydride at a lower elevated temperature until the alcoholic acid number and the aqueous acid number are substantially equal.

2. The epoxy ester of claim 1 wherein said polyfunctional epoxy resin is diglycidyl ether of bisphenol A.

3. The epoxy ester of claim 2 wherein said monocarboxylic acid is octanoic acid and said dicarboxylic acid is azelaic acid.

4. The epoxy ester of claim 2 wherein monocarboxylic acid is 2-ethylhexanoic acid and said dicarboxylic acid is azelaic acid.

5. The epoxy ester of claim 2 wherein said monocarboxylic acid is dehydrated castor oil fatty acid and said dicarboxylic acid is azelaic acid.

6. The epoxy ester of claim 2 wherein said monocarboxylic acid is oleic fatty acid and said dicarboxylic acid is adipic acid.

7. The epoxy ester of claim 2 wherein said monocarboxylic acid is dehydrated castor oil fatty acid and said dicarboxylic acid is adipic acid.

8. The epoxy ester of claim 2 wherein said monocarboxylic acid is octanoic acid and said dicarboxylic acid is adipic acid.

9. The epoxy ester of claim 2 wherein said monocarboxylic acid is lauric acid and said dicarboxylic acid is adipic acid.

10. The coating composition comprising the epoxy ester of claim 1 neutralized with ammonia or N,N-dimethylethanolamine and diluted with water to a solids content of 29 to 31 percent.

11. A coating composition comprising an epoxy ester of claim 2 neutralized with ammonia or N,N-dimethylethanolamine and diluted with water to a solids content of 29 to 31 percent.

12. The coating composition comprising the epoxy ester of claim 3 neutralized with ammonia or N,N-dimethylethanolamine and diluted with water to a solids content of 29 to 31 percent.

13. The coating composition comprising the epoxy ester of claim 4 neutralized with ammonia or N,N-dimethylethanolamine and diluted with water to a solids content of 29 to 31 percent.

14. The coating composition comprising the epoxy ester of claim 5 neutralized with ammonia or N,N-dimethylethanolamine and diluted with water to a solids content of 29 to 31 percent.

15. The coating composition comprising the epoxy ester of claim 6 neutralized with ammonia or N,N-dimethylethanolamine and diluted with water to a solids content of 29 to 31 percent.

16. The coating composition comprising the epoxy ester of claim 7 neutralized with ammonia or N,N-dimethylethanolamine and diluted with water to a solids content of 29 to 31 percent.

17. The coating composition comprising the epoxy ester of claim 8 neutralized with ammonia or N,N-dimethylethanolamine and diluted with water to a solids content of 29 to 31 percent.

18. The coating composition comprising the epoxy ester of claim 9 neutralized with ammonia or N,N-dimethylethanolamine and diluted with water to a solids content of 29 to 31 percent.

19. A metal substrate coated with the coating composition of claim 10.

20. A metal substrate coated with the coating composition of claim 11.

21. A metal substrate coated with the coating composition of claim 12.

22. A metal substrate coated with the coating composition of claim 13.

23. A metal substrate coated with the coating composition of claim 14.

24. A metal substrate coated with the coating composition of claim 15.

25. A metal substrate coated with the coating composition of claim 16.

26. A metal substrate coated with the coating composition of claim 17.

27. A metal substrate coated with the coating composition of claim 18.

* * * * *